US009421557B2

(12) United States Patent
Dziadzio et al.

(10) Patent No.: US 9,421,557 B2
(45) Date of Patent: Aug. 23, 2016

(54) SPRAY NOZZLES

(75) Inventors: Douglas J. Dziadzio, Montague, MA (US); Daniel T. deLesdernier, Greenfield, MA (US); Matthew P. Betsold, Northfield, MA (US); Ronald H. Emerson, Huntington, MA (US)

(73) Assignee: Bete Fog Nozzle, Inc., Greenfield, MA (US)

( * ) Notice: Subject to any disclaimer, the term of this patent is extended or adjusted under 35 U.S.C. 154(b) by 427 days.

(21) Appl. No.: 11/606,591

(22) Filed: Nov. 29, 2006

(65) Prior Publication Data

US 2007/0221540 A1 Sep. 27, 2007

Related U.S. Application Data

(60) Provisional application No. 60/741,022, filed on Nov. 29, 2005.

(51) Int. Cl.
*B05B 7/10* (2006.01)
*B05B 1/14* (2006.01)
(Continued)

(52) U.S. Cl.
CPC . *B05B 1/14* (2013.01); *A62C 31/05* (2013.01); *B05B 1/04* (2013.01); *B05B 7/06* (2013.01); *B05B 7/067* (2013.01)

(58) Field of Classification Search
CPC ........ B05B 11/001; B05B 1/005; B05B 1/341
USPC ......... 239/399, 403, 498, 548, 558, 559, 567, 239/595, 596, 600
See application file for complete search history.

(56) References Cited

U.S. PATENT DOCUMENTS

| 4,443,228 A | 4/1984 | Schlinger |
| 4,793,913 A | 12/1988 | Chessmore et al. |

(Continued)

FOREIGN PATENT DOCUMENTS

| IT | EP 1 375 007 A1 * | 2/2004 | ................ B05B 1/18 |
| JP | 59-22991 A | 2/1984 | |

(Continued)

OTHER PUBLICATIONS

International Search Report and Written Opinion of the International Searching Authority for International Application No. PCT/US 06/46247.

*Primary Examiner* — Davis Hwu
(74) *Attorney, Agent, or Firm* — McCarter & English, LLP

(57) ABSTRACT

A nozzle for discharging first and second fluids in a spray pattern into a vessel, such as oil and steam in a catalytic cracking unit, includes various configurations for preventing erosion of the outlet portion of the nozzle that otherwise might be due, for example, to contact with a catalyst or other predetermined substance. In one such nozzle, the exterior surface of the outlet portion substantially conforms to the internal contour of the vessel. In another such nozzle, the outlet portion defines a plurality of substantially concentric, substantially elliptical-shaped outlet apertures. In another nozzle, the outlet portion is formed of ceramic and is connected to the inlet portion by a metal connector. In another nozzle, the outlet portion defines a plurality of apertures angularly spaced about a peripheral region of the outlet portion for discharging a substantially flat fan spray pattern, and a second outlet portion extending along an upstream portion of the outlet portion for discharging at least part of its spray to prevent any catalyst from contacting the downstream surfaces of the outlet portion.

25 Claims, 11 Drawing Sheets

(51) Int. Cl.
  *A62C 31/05*  (2006.01)
  *B05B 1/04*  (2006.01)
  *B05B 7/06*  (2006.01)

(56) References Cited

U.S. PATENT DOCUMENTS

| | | | |
|---|---|---|---|
| 4,841,999 A * | 6/1989 | Danko | 134/22.1 |
| 4,893,752 A | 1/1990 | Spink et al. | |
| 5,160,706 A | 11/1992 | Khouw et al. | |
| 5,176,325 A | 1/1993 | Vidusek | |
| 5,240,183 A | 8/1993 | Bedaw et al. | |
| 5,306,418 A | 4/1994 | Dou et al. | |
| 5,337,961 A | 8/1994 | Brambani et al. | |
| 5,516,046 A | 5/1996 | Cline et al. | |
| 5,536,392 A * | 7/1996 | Martineau | 208/113 |
| 5,553,783 A | 9/1996 | Slavas et al. | |
| 5,571,484 A * | 11/1996 | Pettit et al. | 422/173 |
| 5,580,237 A * | 12/1996 | Leger | 431/8 |
| 5,603,453 A | 2/1997 | Weaver et al. | |
| 5,615,836 A | 4/1997 | Graef | |
| 5,673,859 A | 10/1997 | Haruch | |
| 5,692,682 A | 12/1997 | Soule | |
| 5,921,472 A | 7/1999 | Haruch | |
| 6,012,652 A | 1/2000 | Holtan et al. | |
| 6,098,896 A | 8/2000 | Haruch | |
| 6,098,897 A | 8/2000 | Lockwood | |
| 6,652,815 B1 | 11/2003 | Sattar | |
| 6,736,960 B1 | 5/2004 | Chen et al. | |
| 8,001,808 B2 * | 8/2011 | Mileo et al. | 65/529 |
| 2004/0195402 A1 | 10/2004 | Joshi | |

FOREIGN PATENT DOCUMENTS

| | | | | |
|---|---|---|---|---|
| JP | 59-145287 A | | 8/1984 | |
| JP | 61-116055 A | | 6/1986 | |
| JP | 3-140395 A | | 6/1991 | |
| JP | 5-339582 A | | 12/1993 | |
| JP | 406238453 A * | | 8/1994 | B23K 9/29 |
| JP | S62-000721 A | | 8/1994 | |
| JP | 9-78073 | | 3/1997 | |
| JP | 9-509890 A | | 10/1997 | |
| JP | 11-262702 | | 9/1999 | |
| JP | 2003-509533 A | | 3/2003 | |
| JP | 2005-288390 A | | 10/2005 | |
| JP | 2007-291398 A | | 11/2007 | |
| RU | 2 198 036 C2 | | 2/2003 | |

* cited by examiner

SPRAY NOZZLES

CROSS REFERENCE TO RELATED APPLICATIONS

This application claims priority to U.S. Provisional Application No. 60/741,022, filed Nov. 29, 2005, the contents of which are hereby expressly incorporated by reference in their entirety as part of the present disclosure.

FIELD OF THE INVENTION

The present invention relates to spray nozzles, and more particularly, to spray nozzles that mix liquid and gas into an atomized spray.

BACKGROUND OF THE INVENTION

Fluidized catalytic cracking (FCC) is one of the major refining methods used in the oil refining industry. The FCC process is employed to crack materials consisting essentially of petroleum-type hydrocarbons to produce products such as fuels for internal combustion engines and heating oils. The cracking process is usually performed in a vertically oriented conduit, or riser including a reactor vessel, that forms part of an FCC system. During the process, hot catalyst particles in an aerated (fluidized) state are typically introduced into a bottom portion of the riser and induced to flow upward. A hydrocarbon feedstock is mixed with steam to become partially fluidized and injected into the catalyst flow as the catalyst travels through the riser, which creates cracking reactions that breakdown the hydrocarbon feedstock into a simpler (lighter) molecular form.

Optimal cracking conditions in an FCC process require a substantially immediate and homogenous mixing of the catalyst and the hydrocarbon feedstock. Such mixing is difficult to achieve, however, and stratified regions of hot catalyst and cold hydrocarbon feedstock typically appear within the catalyst-hydrocarbon flow. Over-cracking and thermal cracking of the hydrocarbon molecules typically occur in the catalyst-rich areas of the flow. Conversely, incomplete cracking of the hydrocarbon molecules usually occurs in hydrocarbon-rich flow regions. These factors can substantially reduce the overall yield of the FCC process. In addition, over-cracking, thermal cracking, and incomplete cracking have undesirable side-effects such as deactivation of the catalyst within the riser due to coke laydown, regeneration of the catalyst within the regenerator due to the combustion of air and residual coke, and the production of excessive amounts of lower-boiling-range gaseous reaction products, e. g., propane and butane gases.

Hence, effective methods for mixing the catalyst and the hydrocarbon feedstock within the reactor vessel are critical to the cracking process. To ensure proper mixing, spray nozzles have been devised that introduce the hydrocarbon-steam mixture into the upward flowing catalyst; however, the nozzles currently available for use in FCC units have significant limitations. First, the nozzles can generate an uneven spray pattern that reduces liquid contact between the hydrocarbon-steam mixture and the catalyst, which in turn impedes homogeneous mixing leading to over-cracking, thermal cracking and/or incomplete cracking of the hydrocarbon molecules. Second, the nozzle covers protrude from the inner vessel wall into the catalyst stream, which leads to premature erosion of the nozzle components and a reduced life cycle of the nozzle; additionally, as the nozzle cover erodes, the geometry of the nozzle's internal flow passages can change resulting in altered spray patterns, which can in turn reduce the consistency and overall output of the yield of the FCC process. Further, the protruding nozzle covers reduce the flow area of the catalyst and create down stream low pressure zones in the vessel that generate eddy currents that facilitate erosion of the nozzle cover. Still further, due to the constant temperature fluctuations within the FCC vessel, the nozzle covers are susceptible to thermal shock, which causes cracking which further contributes to their reduced life cycle. Similar limitations are present in other refining processes that utilize nozzles to introduce fluids into a mixing vessel, such as reduced crude conversion (RCC) processes.

In some spray nozzle applications, ceramic nozzle covers have been used in place of standard metallic alloy covers. Though ceramic covers can offer many advantages, joining a metal to a ceramic is a challenge because ceramics have extremely high melting points and are chemically relatively inert preventing them from being directly welded or glued; therefore, mechanical joints of various types are employed. However, the mechanical joints currently available often fail prematurely and without warning due to fluctuating thermal expansion and thermal contractions caused by temperature variances in the applications of the nozzle.

Therefore, to improve the yield of FCC and other refining processes and reduce maintenance expenses associated with frequent nozzle cover and joint replacements, there is a need for a spray nozzle that generates a consistently flat spray pattern for improved homogeneous mixing, reduces down stream low pressure zones and eddy currents to minimize catalyst erosion, and/or employs a nozzle cover that has a reduced profile to minimize protrusion into the catalyst stream to, in turn, reduce cover erosion and maximize the flow area of the catalyst, is made up of an erosion resistant material, and is ductile enough to avoid thermal shock. Further, there is a need for a joint/coupling device that is capable of maintaining a tight seal between the nozzle cover (outlet) and the fluid inlet and can withstand thermal shock caused by constant temperature fluctuations.

SUMMARY OF THE INVENTION

In accordance with a first aspect, the present invention is directed to a spray nozzle for discharging at least one fluid in an atomized spray into a vessel. The nozzle comprises a ceramic cover or outlet defining at least one outlet aperture and a metallic inlet portion defining at least one inlet conduit for receiving the at least one fluid. The nozzle further comprises a metallic connector that connects the ceramic outlet or cover to the metallic inlet and provides a compressive preload to the ceramic outlet to prevent looseness between the metallic inlet and the ceramic outlet following differential thermal expansion and contraction.

In accordance with a more detailed aspect, the present invention is directed to a nozzle for discharging first and second fluids in an atomized spray into a vessel. The nozzle comprises an inlet portion formed of metal and defining at least one inlet conduit for receiving first and second fluids. An outlet portion of the nozzle is formed of ceramic and defines a plurality of outlet apertures extending therethrough in fluid communication with the inlet portion, and spaced relative to each other for atomizing the first and second fluids in a spray pattern emanating therefrom. The nozzle further comprises a metal connector coupled on an upstream end thereof to the metal inlet portion, and coupled on a downstream end thereof to the ceramic outlet portion. The metal connector engages the ceramic outlet portion and exerts a substantially predetermined compressive preload thereon. In one embodiment of the present invention, the metal connector tapers inwardly in the direction from the upstream end toward the downstream end thereof. In one such embodiment, the metal connector defines a plurality of first threads, and the inlet portion defines a plurality of second threads that threadedly engage the first threads to fixedly secure the metal connector and ceramic outlet portion to the inlet portion and thereby allow assembly of the ceramic outlet portion with a specified preload. Also in one such embodiment, the metal connector is welded on the upstream end thereof to the inlet portion. Alternatively, the metal connector can be welded to the inlet portion without threadedly connecting the metal connector to the inlet portion, or the metal connector can be brazed or adhesively bonded to the ceramic outlet portion.

In accordance with another aspect, the present invention is directed to a nozzle for discharging first and second fluids in an atomized spray into a vessel defining an internal contour. The nozzle comprises an inlet portion defining at least one inlet conduit for receiving first and second fluids. An outlet portion of the nozzle defines an exterior surface that substantially conforms to the internal contour of the vessel, and a plurality of outlet apertures extending through the exterior surface in fluid communication with the inlet portion and angularly spaced relative to each other about a central axis of the outlet portion. Each outlet aperture defines a flow axis for directing a mixture of first and second fluids through the outlet aperture in the direction of the respective flow axis.

In accordance with another aspect, the present invention is directed to a nozzle for discharging first and second fluids in an atomized spray into a vessel. The nozzle includes an inlet portion defining a plurality of substantially concentric inlet conduits for receiving first and second fluids. The nozzle further includes an outlet portion defining a plurality of substantially concentric outlet apertures radially spaced relative to each other, and each outlet aperture is connected in fluid communication with a respective inlet conduit for directing a respective one of the first and second fluids therethrough.

In accordance with another aspect, the present invention is directed to a nozzle including an inlet portion defining at least one inlet conduit for receiving first and second fluids. An outlet portion of the nozzle is connected to the downstream end of the inlet portion. The outlet portion defines an exterior surface and a mixing chamber for receiving the first and second fluids from the inlet portion. The outlet portion further defines a plurality of first outlet apertures extending through the exterior surface in fluid communication with the mixing chamber, and angularly spaced relative to each other about a peripheral portion of the exterior surface for atomizing the first and second fluids in a spray pattern emanating therefrom. In one embodiment of the present invention, the plurality of outlet apertures are angularly spaced relative to each other about an axis of the outlet portion, and each outlet aperture defines a flow axis for directing a mixture of first and second fluids through the outlet aperture in the direction of the flow axis. In one such embodiment, the plurality of flow axes cooperate to define a substantially flat fan spray pattern. The outlet portion further defines at least one second outlet aperture extending along an upstream side of the exterior surface and in fluid communication with the mixing chamber for directing a spray of the first and second fluids therefrom. At least some of the spray emitted from the second outlet aperture is directed over the downstream portions of the exterior surface to thereby prevent a predetermined substance, such as a catalyst when used in FCCU applications, from collecting on the exterior surface and causing erosion of the surface. In one such embodiment, the second outlet aperture extends substantially across the entire width of the upstream side of the exterior surface of the outlet portion to ensure that the spray emitted therefrom substantially covers the downstream portions of the exterior surface and thereby prevents erosion of such surface.

In accordance with another aspect, the present invention is directed to a spray nozzle for discharging at least one fluid in an atomized spray, comprising first means formed of metal and including at least one inlet for receiving the at least one fluid; second means formed of ceramic in fluid communication with the first means for emitting the at least one fluid in an atomized spray therefrom; and third means for connecting the second means to the first means and applying a compressive preload to the second means to prevent looseness between the first and second means following differential thermal expansion and contraction. In one embodiment of the present invention, the first means is a metallic inlet, the second means is a ceramic outlet, and the third means is a metallic connector extending between the first and second means. In one such embodiment, the metallic connector includes a ring and a socket, and the ring is sized to fit into the second means and the socket. In one such embodiment, the ceramic outlet defines a tapered section on an outside portion and a reverse step on an inside portion, the socket defines a tapered section, and the tapered portion of the outlet portion engages the tapered portion of the socket. In one such embodiment, the ring is comprised of at least two pieces to facilitate installation of the ring into the outlet portion and socket.

In accordance with another aspect, the present invention is directed to a method of spraying at least one fluid into at least one of a catalytic cracking and reduced crude conversion vessel. The method comprises the steps of:

(i) providing a spray nozzle for discharging at least one fluid in an atomized spray into the vessel, wherein the spray nozzle comprises a outlet portion defining at least one outlet aperture, a metallic inlet portion defining at least one inlet conduit for receiving the at least one fluid, and a metallic connector that connects the ceramic outlet portion to the metallic inlet;

(ii) applying with the metallic connector a compressive preload to the ceramic outlet and, in turn, preventing looseness between the metallic inlet and the ceramic outlet following differential thermal expansion and contraction;

(iii) introducing a catalyst stream into the vessel; and (iv) substantially preventing erosion of the nozzle by the catalyst stream by exposing only the ceramic outlet portion of the nozzle to the catalyst stream.

In one embodiment of the invention, the method further comprises the step of forming an exterior surface of the outlet portion to substantially conform to an internal contour of the vessel to, in turn, minimize the profile of the outlet portion within the vessel and further substantially prevent erosion of the outlet portion by the catalyst.

One advantage of the present invention is that the various configurations of the cover or outlet portion of the nozzle can substantially prevent erosion of the exterior surface otherwise due, for example, to contact with a predetermined substance, such as a catalyst in catalytic cracking operations. Furthermore, the nozzles can be designed if desired to generate a substantially flat fan spray pattern for improved homogeneous mixing. A further advantage of some embodiments of the present invention is that the nozzles can be designed to reduce downstream low pressure zones and eddy currents to, in turn, reduce or minimize catalyst erosion in comparison to prior art nozzles. Another advantage of certain embodiments of the present invention is that the nozzles may employ a cover that has a reduced profile to minimize protrusion of the nozzle into a catalyst stream and, in turn, maximize the flow area and reduce erosion of the nozzle by the catalyst. A still further advantage of certain embodiments of the invention is that the nozzle covers can be made of erosion resistant material, such as ceramic, that are ductile enough to avoid thermal shock and thereby prolong the useful life of the nozzle in comparison to the prior art.

Other objects and advantages of the present invention will become more readily apparent in view of the following detailed description of the currently preferred embodiments and accompanying drawings.

DETAILED DESCRIPTION OF THE CURRENTLY PREFERRED EMBODIMENTS

Figure 1:
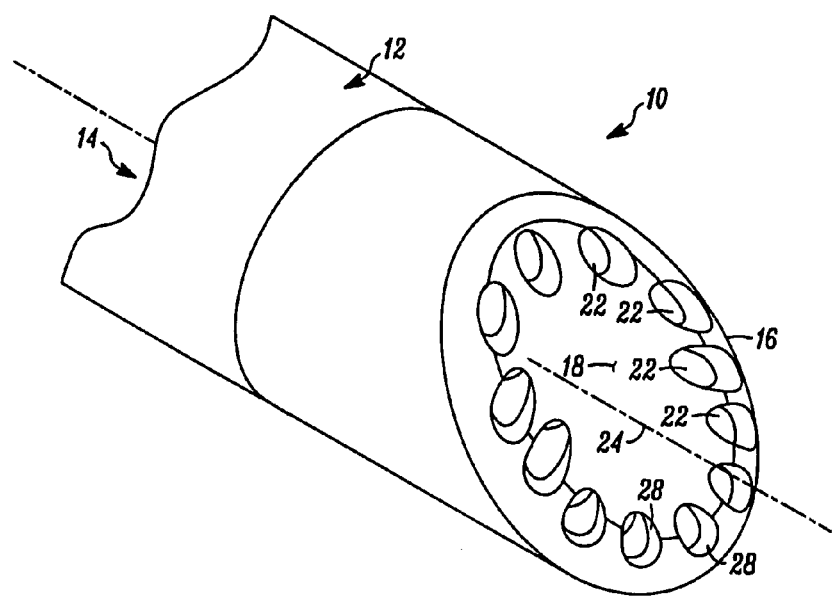
FIG. 1 is a partial, perspective view of a first embodiment of a nozzle embodying the present invention and defining on a cover or outlet portion thereof an exterior surface shaped to substantially conform to the interior surface of vessel within which the nozzle is mounted.

In FIGS. 1 through 8 a first embodiment of a nozzle of the present invention is indicated generally by the reference numeral 10. The nozzle 10 is for discharging first and second fluids in an atomized spray into a vessel 20 defining an internal contour. In one embodiment of the present invention the first fluid is oil, the second fluid is gas or steam, and the vessel is a catalytic cracking vessel. However, as may be recognized by those of ordinary skill in the pertinent art based on the teachings herein, the nozzles of the present invention are equally usable with any of numerous different types of fluids in connection with any of numerous different types of applications that are currently known, or that later become known.

The nozzle 10 comprises an inlet portion 12 defining at least one inlet conduit 14 for receiving at least one fluid and, in one embodiment, first and second fluids. An outlet portion 16 of the nozzle defines an exterior surface 18 that substantially conforms to the internal contour of the vessel 20, and a plurality of outlet apertures, shown typically at 22, extending through the exterior surface 18 in fluid communication with the inlet portion 12 and angularly spaced relative to each other about a central axis 24 of the outlet portion 16. As shown typically in FIG. 4, each outlet aperture 22 defines a flow axis 26 for directing a mixture of first and second fluids through the outlet aperture in the direction of the respective flow axis.

Figure 2:
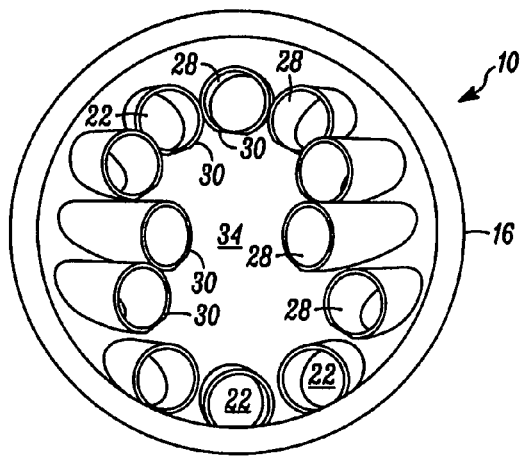
FIG. 2 is an internal perspective view of the outlet portion of FIG. 1.
Figure 3:
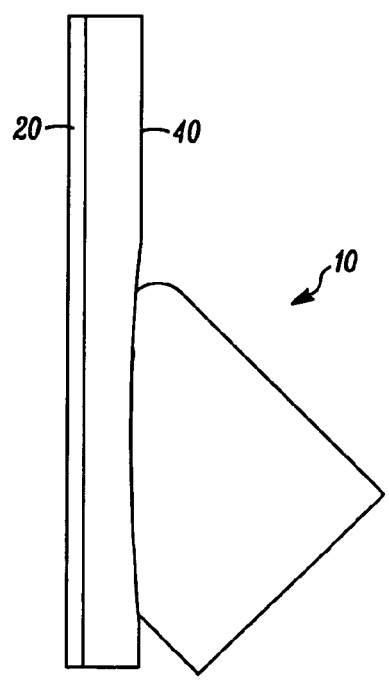
FIG. 3 is a side view of the outlet portion mounted within a vessel wall, such as the wall of a catalytic cracking unit.

As shown typically in FIGS. 1 and 2, each outlet aperture 22 defines a flow surface 28 extending from approximately the exterior surface 18 of the outlet portion upstream in the direction of the respective flow axis 26 a predetermined distance sufficient to substantially uniformly atomize the first and second fluid mixture within the vessel in a substantially flat fan spray pattern. In the currently preferred embodiments of the nozzle 10, the predetermined distance is at least about 0.4 times the diameter of the respective outlet aperture 22 or greater. In one such embodiment, for an outlet aperture 22 defining a diameter of about 0.866 inch, the predetermined distance (or minimum orifice length) was determined to be about 0.34 inch. Generally, it is believed that within limits, the greater the predetermined distance (i.e., the length of the orifice surface) the better will be the formation of the flat fan spray pattern. If the predetermined distance is too short, the spray pattern will be more of a hollow oval pattern as opposed to a virtual flat fan spray pattern, which is described in further detail below. In the illustrated embodiment of the present invention, and as shown best in FIG. 2, the nozzle 10 comprises a plurality of substantially straight tubular portions 30, wherein each tubular portion extends upstream from a respective outlet aperture 22 and defines the predetermined distance.

In the illustrated embodiment, the substantially straight tubular portions 30 are each substantially cylindrical and are formed integral with the outlet portion, such as by molding; however, the tubular portions may take any of numerous different shapes and may be formed separately from the outlet portion, and connected thereto such as by welding, or may be formed integral with the outlet portion or otherwise in any of numerous different ways, that are currently known or that later become known.

Figure 4:
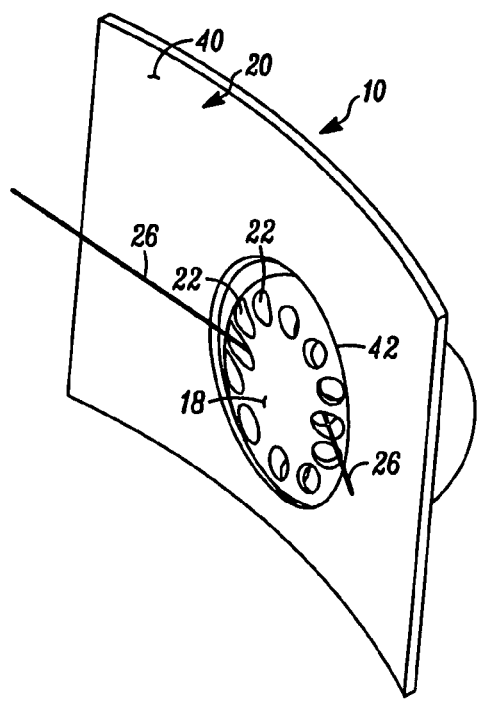
FIG. 4 is a perspective view of the outlet portion of FIG. 3 mounted within the vessel wall with outwardly extending line segments illustrating the flow axes of the respective outlet apertures.
Figure 5:
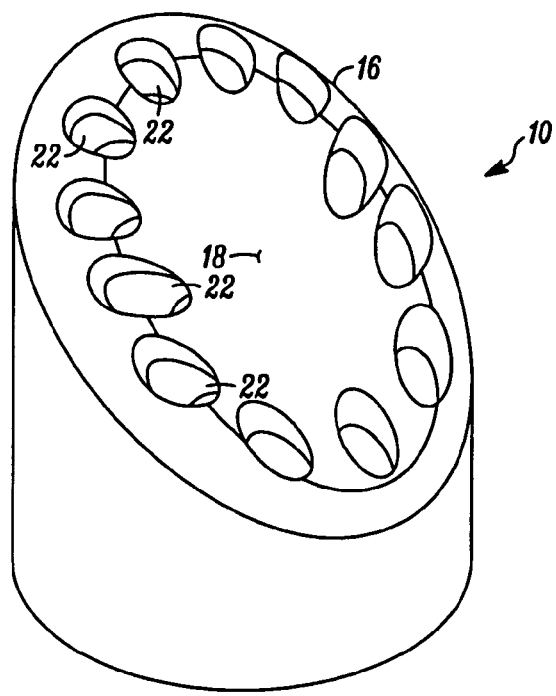
FIG. 5 is another view of the outlet portion of FIG. 1.
Figure 6:
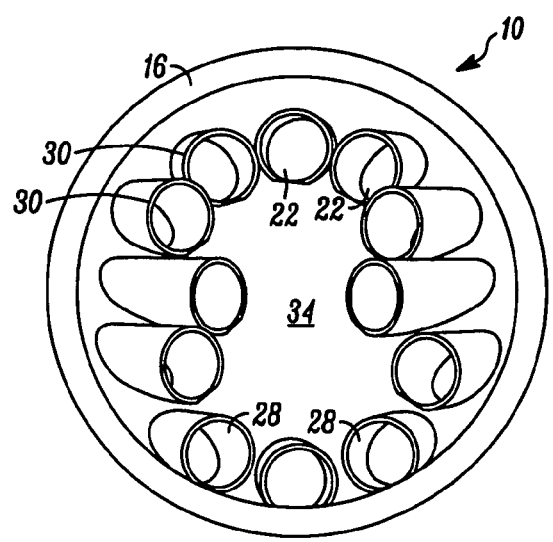
FIG. 6 is another view of the interior of the outlet portion of FIG. 1.
Figure 7:
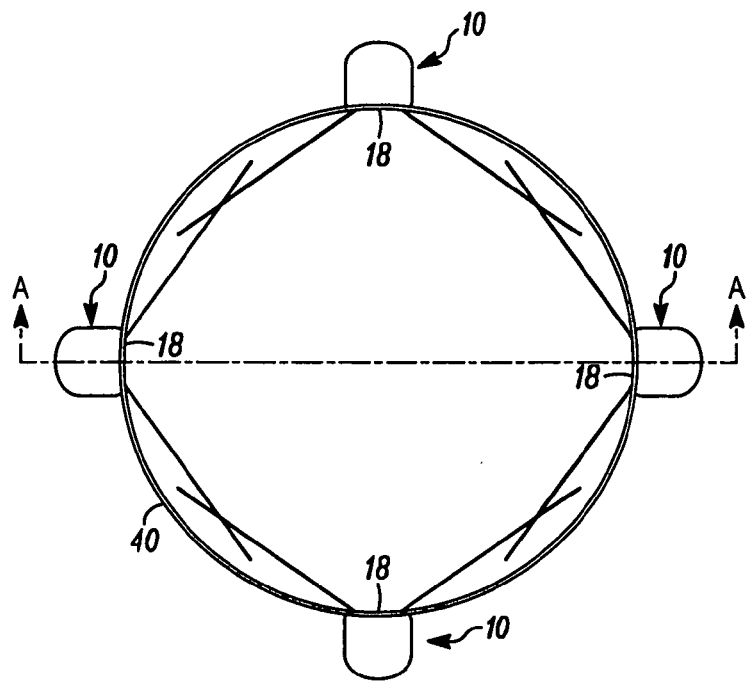
FIG. 7 is a top plan schematic illustration of four nozzles incorporating the covers or outlet portions of FIG. 1 mounted within a catalytic cracking vessel and spaced about 90 degrees relative to each other.
Figure 8:
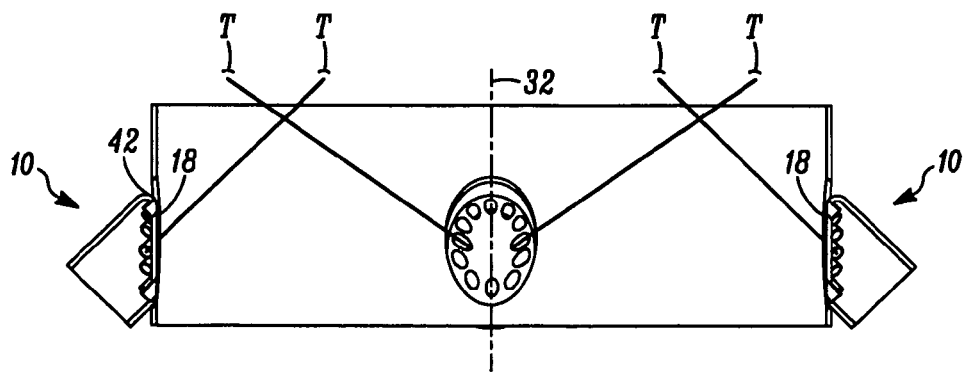
FIG. 8 is a cross-sectional view of the vessel of FIG. 7.
Figure 9:
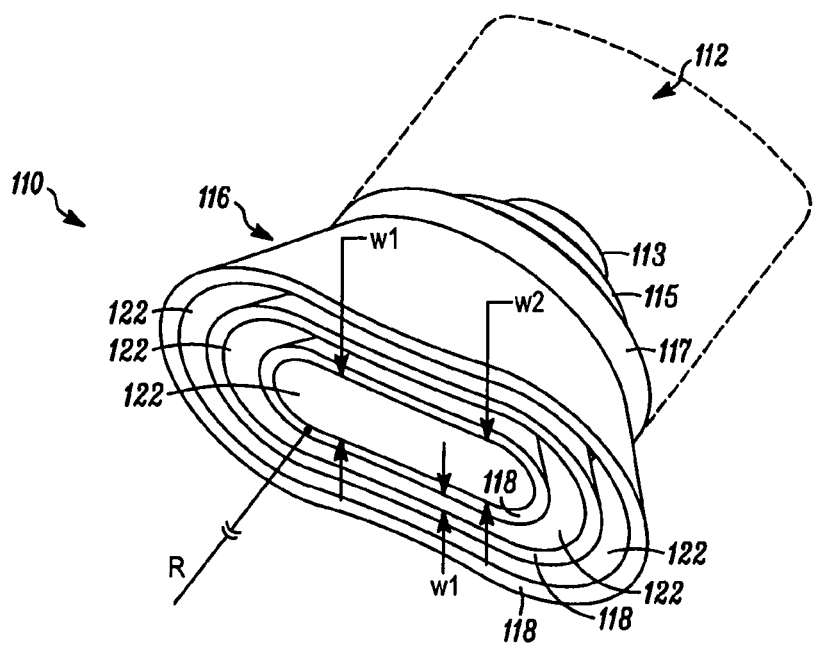
FIG. 9 is a partial, perspective view of a second embodiment of a nozzle embodying the present invention and defining a plurality of substantially concentric, substantially elliptical-shaped outlet apertures for emanating a predetermined spray pattern therefrom.
Figure 10:
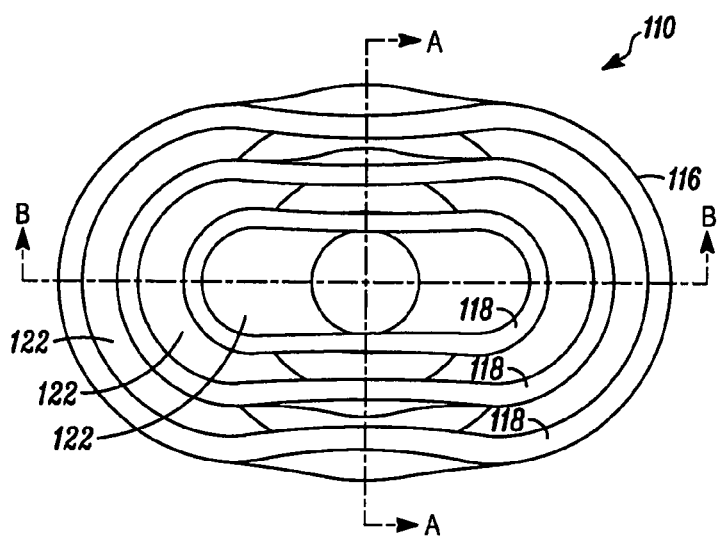
FIG. 10 is a somewhat schematic, front plan view of the nozzle outlet portion of FIG. 9.

As shown typically in FIGS. 4, 7 and 8, the vessel 20 is substantially cylindrical, and the exterior surface 18 of the outlet portion is defined by a radius "R" that is substantially equal to a radius defining the internal contour of the vessel. As may be recognized by those of ordinary skill in the pertinent art based on the teachings herein, the vessel may take any of numerous different shapes, and the exterior surface of the outlet portion likewise may take any of numerous different shapes to substantially conform to the internal contour of any such vessel.

The outlet apertures 22 preferably are configured to form a substantially flat fan spray pattern in accordance with the teachings of U.S. Pat. Nos. 5,553,783 and 5,692,682, both entitled "Flat Fan Spray Nozzle", and each of which is assigned to the Assignee of the present invention and is hereby expressly incorporated by reference in its entirety as part of the present disclosure. In accordance with the teachings of the foregoing patents, approximately all of the flow axes 26 of the outlet apertures 22 are directed toward a target "T" within the vessel for atomizing and directing a mixture of the first and second fluids in a spray pattern flowing in a direction across the target, and the target is substantially located within a plane extending in the flow direction of the spray pattern. In addition, the flow axis 26 of each outlet aperture 22 is directed to intersect the target "T" such that the outlet apertures 22 cooperate to define a substantially flat fan spray pattern, and the target "T" is substantially located within a plane oriented at an acute angle relative to a vertical axis 32 of the vessel 20. In one embodiment of the present invention, the target "T" is linear and approximately intersects the central axis 24 of the end surface 18 of the outlet portion.

The nozzle 10 further comprises a mixing chamber 34 in fluid communication between the inlet portion and the outlet portion for mixing the first and second fluids therein. In the illustrated embodiment, the mixing chamber 34 is formed within the outlet portion 16 immediately upstream of the outlet apertures 22.

The nozzle 10 preferably further comprises at least one vane (not shown) located between the mixing chamber 34 and inlet portion 12, and extending transversely relative to an elongated axis of the inlet portion for receiving a portion of the first and second fluids and creating a swirling annular flow, and defining at least a portion of an aperture in an approximately central portion thereof for receiving a portion of the first and second fluids and creating a substantially axial flow. The currently-contemplated vanes and the manner of incorporating each such vane in the nozzles of the present invention are shown in the commonly-assigned patents incorporated by reference above. In one such embodiment, each vane defines a substantially convex lobe and a substantially concave lobe. In this embodiment, each lobe is approximately semi-circular, and the convex lobe is located upstream relative to the concave lobe. Preferably, the nozzle comprises two vanes, wherein each vane extends transversely through a respective substantially semi-circular portion of the inlet portion 12. As an alternative to the vane(s), the nozzle may comprise a spray member (not shown) that helically extends in the direction from the inlet portion toward the outlet portion, as further described in the commonly-assigned patents incorporated by reference above.

As shown in FIG. 4, the outlet portion 16 is received within an aperture 42 formed through a wall 40 of the vessel 20 such that the exterior surface 18 of the outlet portion substantially conforms to the interior contour of the vessel wall.

The nozzle 10 is particularly suitable for use as a feed distributor in fluidized catalytic cracking units ("FCCU") and reduced crude conversion units ("RCCU"). FCCU and RCCU typically convert materials consisting essentially of petroleum-type hydrocarbons which are liquid at normal or a higher temperature and normal pressure, or recycled material, primarily to produce motor or other liquid fuels or naphthas of an average molecular weight lower than that of the charge stock, together with by-product normally gaseous hydrocarbons. The conversion is typically carried out:

a) at temperatures in excess of about 500 degrees Fahrenheit; and b) with a solid catalyst present in the reaction zone for the specific purpose of effecting or influencing the reaction and whereby there is produced a result as to yield, character of product or speed of reaction different to a definitely determinable degree from the result which would be produced with the same starting materials under conditions otherwise the same but in the absence of such catalyst.

Also typically in such units (1) the conversion and catalyst regeneration proceed in separate zones with transfer of catalyst between zones, (2) the catalyst is maintained in the reaction zone in the form of a fluid mass made up of finely divided solid catalyst dispersed in the hydrocarbon vapors undergoing conversion, and (3) the average residence time of the catalyst in the reaction zone is greater than the average residence time of the hydrocarbon vapors in the reaction zone.

One advantage of the nozzle 10 is that the profile of the cover or outlet portion 16 that projects into the vessel, and thus projects into the catalyst process stream in the embodiment where the vessel is a catalytic cracking vessel, is reduced in comparison to prior art spray nozzles, thus minimizing any erosion of the outlet portion due to contact with the catalyst process and thereby increasing the useful life of the nozzles in comparison to prior art spray nozzles. Another advantage of the nozzle 10 is that the straight tubular portions extending upstream from each outlet aperture enable the nozzle to achieve a spray pattern, velocity and drop size comparable to prior art spray nozzles while nevertheless significantly reducing the profile of the nozzle that projects into the interior of the vessel. Yet another advantage of the nozzle 10 is that because the profile of the outlet portion effectively removes the nozzle from the catalyst stream within the catalytic cracking vessel, thereby protecting the cover from catalytic erosion, the nozzle cover or outlet portion can be manufactured from more ductile materials in comparison to the materials used in prior art spray nozzles for catalytic cracking, thus enabling the nozzles to better withstand thermal shock than such prior art nozzles. A further advantage of the nozzle 10 is that because the outlet portion substantially conforms to the internal contour of the vessel, the cover or outlet portion is effectively a part of the vessel wall, thus significantly reducing the protrusion of the nozzle into the riser or vessel in comparison to prior art spray nozzles, and thereby maximizing the flow area of the catalyst within the riser and minimizing erosion otherwise caused within eddies of the catalyst downstream of such protrusions as encountered in prior art spray nozzles.

As may be recognized by those of ordinary skill in the pertinent art based on the teachings herein, although the nozzle 10 employs a multi-aperture virtual flat fan configuration, the external surface of the cover or outlet portion that substantially conforms to the internal contour of the vessel equally may be applied to any of numerous other types of nozzles that are currently known, or that later become known, such as nozzles that employ slots or flow passages of other shapes.

In FIGS. 9 through 11A and 11B, another embodiment of a nozzle of the present invention is indicated generally by the reference number 110. The nozzle 110 is similar in certain respects to the nozzle 10 described above with reference to FIGS. 1 through 8, and therefore like reference numerals preceded by the numeral "1" are used to indicate like elements. Like the nozzle 10, the nozzle 110 is provided for discharging first and second fluids in an atomized spray into a vessel (not shown). The nozzle 110 includes an inlet 112 defining a plurality of substantially concentric inlet conduits 113, 115 and 117 for receiving first and second fluids. The nozzle 110 further includes an outlet portion 116 defining a plurality of substantially concentric outlet apertures 122 radially spaced relative to each other, and each outlet aperture 122 is connected in fluid communication with a respective inlet conduit 113, 115 and 117 for directing a respective one of the first and second fluids therethrough.

Figure 11A:
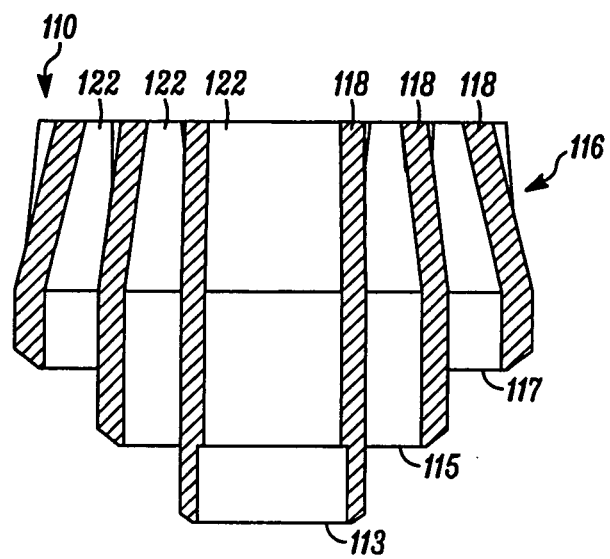
FIG. 11A is a cross-sectional view of the nozzle outlet portion of FIG. 10 taken along line A-A thereof.
Figure 11B:
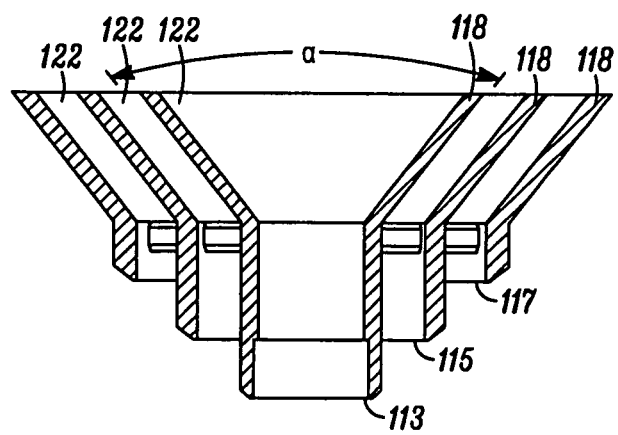
FIG. 11B is a cross-sectional view of the nozzle outlet portion of FIG. 10 taken along line B-B thereof.
Figure 12:
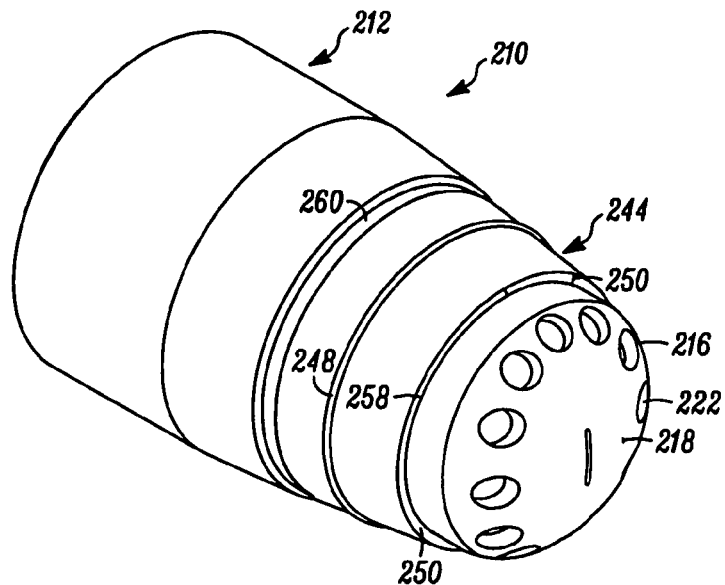
FIG. 12 is a partial, perspective view of a third embodiment of a nozzle embodying the present invention and including a ceramic cover or outlet portion connected by a metallic alloy connector to a metallic alloy inlet portion.

The outlet apertures 122 atomize the first and second fluids in a spray pattern emanating therefrom. Preferably, each outlet aperture 122 receives a respective one of the first and second fluids, discharges the respective fluid in an atomized spray therefrom, and the plurality of apertures 122 cooperate to define an atomized spray pattern including the first and second fluids mixed therein. In a currently preferred embodiment of the nozzle 110, the plurality of outlet apertures 122 are configured to direct at least one of the emitted first and second fluids to impact the other of the first and second fluids and, in turn, substantially uniformly atomize at least one of the first and second fluids in a substantially flat fan spray pattern. In one currently preferred embodiment of the nozzle 110, the first fluid is oil, the second fluid is steam, and the vessel is a catalytic cracking vessel. However, as with the embodiment described above, the nozzles 110 of the present invention are equally usable with other fluids, apparatus, systems and processes. In the illustrated embodiment for FCCU applications, the central conduit 113 transmits steam, the middle conduit 115 transmits oil, and the outer conduit 117 transmits steam. As shown in FIG. 11A, the walls defining the end surface 118 converge inwardly toward the exterior surface in the central region of the nozzle, and in the lateral regions of the nozzle the walls diverge outwardly toward the end surface 118. Additionally, the outlet apertures 122 diverge outwardly at an angle α with respect to one another (FIG. 11B); in one embodiment, α is in between about 1° and 180° and, in yet another embodiment, α is about 90°.

In a currently preferred embodiment of the present invention, the plurality of outlet apertures 122 are configured to define a substantially flat fan spray pattern. Preferably, and as shown typically in FIGS. 7 and 9 with reference to the nozzle 10 above, the substantially flat fan spray pattern is oriented at an acute angle relative to a vertical axis of the vessel.

In accordance with a currently preferred embodiment of the present invention, each outlet aperture defines at least one width "W" selected to control the amount of fluid passing therethrough in comparison to the other portions of the respective aperture and/or the other apertures 122. In the illustrated embodiment of the present invention, each of the outlet apertures 122 defines a substantially elliptical shape. As shown typically in FIG. 9, for the first or central outlet aperture 122, the radial width "W" is relatively narrow at "W1" in a central region of the nozzle and relatively wide at "W2" in a lateral region of the nozzle. Similarly, for the second or middle outlet aperture 122, the radial width "W" is relatively narrow at "W1" in a central region of the nozzle and relatively wide at "W2" in a lateral region of the nozzle. Accordingly, for the first and second outlet apertures 122, the flow of the respective first or second fluid is relatively less in the central region of the nozzle and relatively greater in the lateral regions of the nozzle. For the third or outer aperture 122, on the other hand, the width "W" is substantially constant throughout the substantially elliptical-shaped aperture to thereby deliver a substantially uniform flow of the respective first or second fluid throughout the aperture. As may be recognized by those of ordinary skill in the pertinent art based on the teachings herein, the substantially concentric outlet apertures may take any of numerous different shapes that are currently known, or that later become known, and the width (s) of each aperture may be set as desired or otherwise required, for performing the functions of the outlet apertures, such as for emitting a substantially flat fan spray pattern, and/or for controlling the amount of flow of the first and/or second fluids in the respective regions of the spray pattern emitted from the nozzle. Accordingly, the variously shaped, substantially concentric apertures may each have a geometry that is not a constant along the entire perimeter of the aperture. Further, the shape and density of the spray pattern, droplet size, inclination of the flat fan spray with respect to the nozzle axis, and exit velocity of the fluids may be controlled by varying the geometry, especially the width of the apertures.

As shown in FIG. 4 with reference to the nozzle 10 described above, the outlet portion 116 is received within an aperture formed through the wall of the vessel. In one embodiment (not shown) the exterior surface 118 of the outlet portion substantially conforms to the interior contour of the vessel wall and is defined by a radius "R" (not shown) that is selected to substantially conform to (or be substantially equal to) a radius defining the interior surface of the vessel within which the nozzle is to be mounted. As may be recognized by those of ordinary skill in the pertinent art based on the teachings herein, the shape of the exterior surface may be defmed only in part by the radius "R", or may define a different shape in order to substantially conform to the interior contour of the vessel within which the nozzle is mounted.

One advantage of the nozzle 110 is that the multiple annular passages eliminate the geometric shapes used in prior art spray nozzles that can cause increased stress that may, in turn, lead to cracks and/or mechanical failures over the operation of the nozzle, such as in FCCU applications. Yet another advantage of the nozzle 110 is that the multiple annular passages can produce a relatively thinner flat fan spray pattern that promotes liquid contact with the catalyst in a concentrated area when used, for example, in FCCU applications.

Another advantage of the nozzle 110 is that the atomization and flow to various parts or regions of the spray pattern can be controlled by varying the predetermined widths "W" of the annuli (or substantially concentric outflow passages) in different parts or regions of the nozzle. For example, it is possible to direct more flow to the outside or lateral regions of the spray pattern, if desired or otherwise required, by making the annulus width relatively large in the portions thereof that direct flow to the outside or lateral regions of the spray pattern. In addition, it is possible to increase or decrease the degree of atomization of the liquid in a particular region of the spray pattern by increasing or decreasing, respectively, the width of the gas aperture(s) to correspondingly increase or decrease the flow of gas mixed with the liquid in such region (s). Accordingly, the novel outlet aperture configuration allows customization of the flow and droplet sizes to different areas of the spray pattern.

In FIGS. 12 through 14, another embodiment of a nozzle of the present invention is indicated generally by the reference number 210. The nozzle 210 is similar in certain respects to the nozzles 10 and 110 described above with reference to FIGS. 1 through 12, and therefore like reference numerals preceded by the numeral "2", or preceded by the numeral "2" instead of the numeral "1", are used to indicate like elements.

The nozzle 210 is provided for discharging first and second fluids in an atomized spray into a vessel (not shown). The nozzle 210 comprises an inlet portion 212 formed of metal and defining at least one inlet conduit 214 for receiving first and second fluids. An outlet portion 216 is formed of ceramic and defines a plurality of outlet apertures 222 extending therethrough in fluid communication with the inlet portion, and spaced relative to each other for atomizing the first and second fluids in a spray pattern emanating therefrom. Although the illustrated outlet portion 218 defines a substantially convex-shaped exterior surface, it may if desired define an exterior surface that substantially conforms to an internal contour of the vessel as described above. As with the nozzle 10 described above, the plurality of outlet apertures 222 are angularly spaced relative to each other about an axis of the outlet portion, and each outlet aperture defines a flow axis for directing a mixture of first and second fluids through the outlet aperture in the direction of the flow axis. Preferably, the plurality of flow axes cooperate to define a substantially flat fan spray pattern.

In one embodiment of the invention, the ceramic is a reaction bonded silicon carbide and, in a preferred embodiment, the ceramic is a silicon nitride such as, for example, SL 200 ST, which is a product of CeramTec AG; however, as may be recognized by those of ordinary skill in the pertinent art based on the teachings herein, other ceramic or non-metallic materials that are currently known, or that later become known, equally may be used.

As previously noted, joining a metal to a ceramic is a challenging disposition. Since ceramics have extremely high melting points and are chemically relatively inert they cannot be welded or glued so mechanical joints of various types are employed. The challenge is even greater when the service temperature of the joint is elevated because of the differences in the thermal expansion rate. In addition, ceramics tend to fail without warning when tensile stresses are applied. Therefore, to fasten the ceramic outlet portions to the metallic inlet portions, the nozzle 10, in one embodiment, further comprises a metal connector 244 coupled on an upstream end 248 thereof to the metal inlet portion 212, and coupled on a downstream end 250 thereof to the ceramic outlet portion 216. As can be seen, the metal connector 244 engages the ceramic outlet portion 216 and exerts a substantially predetermined compressive preload thereon. Preferably, the metal connector 244 tapers inwardly at 246 in the direction from the upstream end 248 toward the downstream end 250 thereof. Also in the illustrated embodiment, the metal connector 244 defines a plurality of first threads 254, and the inlet portion 212 defines a plurality of second threads 256 that threadedly engage the first threads to fixedly secure the metal connector 244 and ceramic outlet portion 216 to the inlet portion 212 and thereby allow assembly of the ceramic outlet portion with a specified preload. Also in the illustrated embodiment, the metal connector 244 is welded at 260 on the upstream end 248 thereof to the inlet portion 212 to prevent rotation of the metal connector 244 and consequent loss of preload.

As can be seen, the metal connector 244 defines a connector inlet aperture on the upstream end 248 thereof and a connector outlet aperture 258 on the downstream end 250 thereof. The tapered portion 246 of the metal connector 244 extends between the inlet aperture and outlet aperture 258 and tapers inwardly in the direction from the upstream end 248 toward the downstream end 258. The ceramic outlet portion 216 defines a ceramic tapered connecting portion 252 received within and engaged with the tapered portion 246 of the metal connector 244. The exterior surface 218 of the outlet portion 216 defining the plurality of outlet apertures 222 extends through the connector outlet aperture 258. As can be seen, the tapered portion of the metal connector engages the tapered portion of the ceramic outlet portion and exerts a compressive preload thereon to prevent or reduce mechanical failure. In addition, as can be seen, the metal connector geometry is designed to flex over the operating conditions of the applications of the nozzle, such as FCCU applications. In one embodiment of the invention, the shrinkage of the weld metal is selected to set a substantially predetermined compressive preload of the metal connector on the ceramic outlet portion to reduce or prevent mechanical failure.

If desired, the outlet portion can be welded to the inlet portion but not threadedly connected to the inlet portion. In this case, the shrinkage of the weld metal is selected to set a substantially predetermined compressive preload of the metal connector on the ceramic outlet portion to reduce or prevent mechanical failure.

In an alternative embodiment of the invention, at least one of the metal connector 244 and ceramic outlet portion 216 is brazed to the other. A specially selected material such as an Au/Ni alloy or multi-layered materials can be used to braze the two components together and thereby contain the ceramic outlet portion within the metallic alloy connector. In this embodiment, the metal connector and ceramic outlet portion may define cooperating tapered surfaces as shown, or may define different shaped surfaces with a brazed connection therebetween.

In an alternative embodiment of the invention, the nozzle further comprises a chemical bonding agent that chemically bonds at least one of the metal connector and ceramic outlet portion to the other and forms a fluid-tight seal therebetween. In this embodiment, the metal connector and ceramic outlet portion may define cooperating tapered surfaces as shown, or may define different shaped surfaces with a brazed connection therebetween. In an alternative embodiment, a mechanical seal is employed either separately or in combination with a chemical bonding agent to form the fluid-tight between the metal connector and ceramic outlet.

Figure 13:
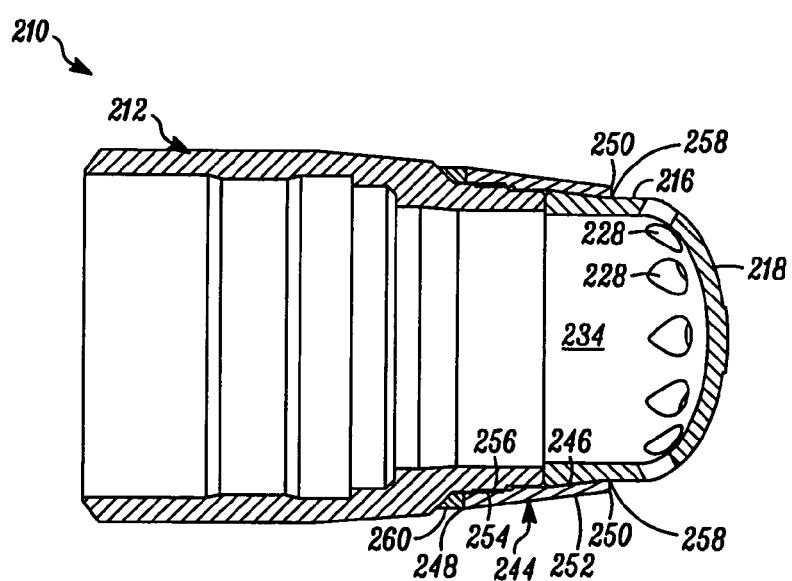
FIG. 13 is a cross-sectional view of the nozzle of FIG. 12.
Figure 14:
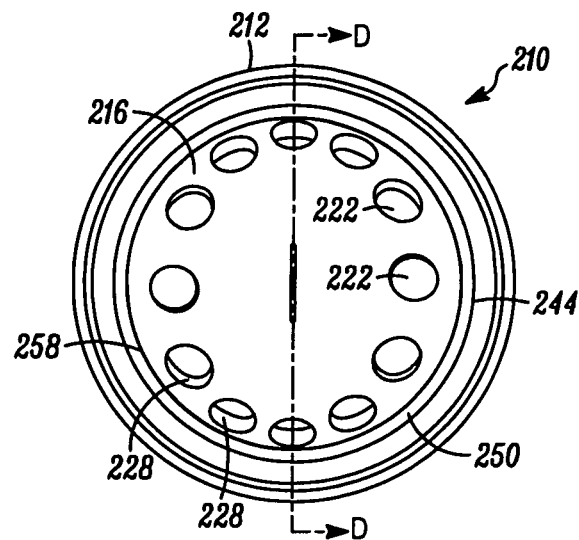
FIG. 14 is an end plan view of the nozzle of FIG. 12.

As may be recognized by those of ordinary skill in the pertinent art based on the teachings herein, the nozzle 210 may include vanes, helically extending members, or like components as described in the above-mentioned patents for facilitating the mixture of the first and second fluids prior to discharge of same through the outlet apertures. As shown in FIG. 13, the inlet portion 212 defines on an interior surface thereof a plurality of annular steps to initiate atomization.

One advantage of the nozzle 210 of the present invention is that the metallic alloy connector provides a positive containment for securing the ceramic outlet portion to the nozzle. The threadedly connected embodiment provides an easy, positive containment method, and further, allows a specified compressive preload to be set. Another advantage of the nozzle 210 is that the embodiments employing a chemical bonding agent or brazed connection provide relatively inexpensive ways to fasten the ceramic outlet portion and to seal the joint against leakage that may require fewer parts than other types of connections, such as mechanical connections.

Yet another advantage of the nozzle 210 is that the metallic alloy connector may be secured to the ceramic outlet portion and nozzle body with a compressive preload as described above that allows the metallic parts to expand relative to the ceramic outlet portion without releasing their hold on it and that otherwise would result in a loose connection.

Figure 15:
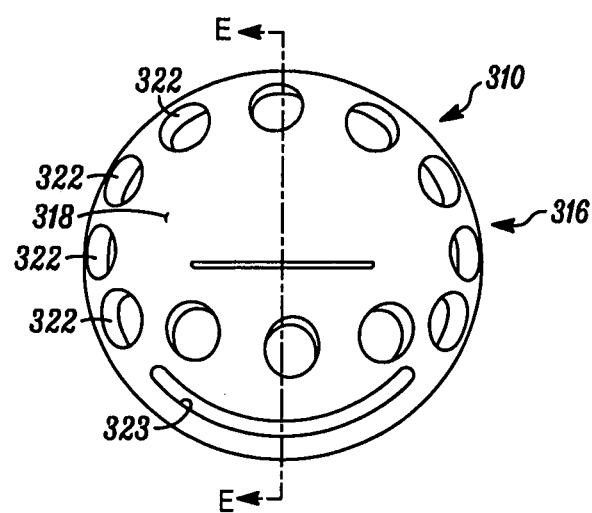
FIG. 15 is a somewhat schematic, front plan view of a fourth embodiment of a nozzle embodying the present invention and including a cover or outlet portion defining an elongated slot formed on an upstream side of the outlet portion for directing at least part of the spray emitted therefrom onto the downstream surfaces of the outlet portion thereby preventing erosion of the outlet portion.
Figure 16:
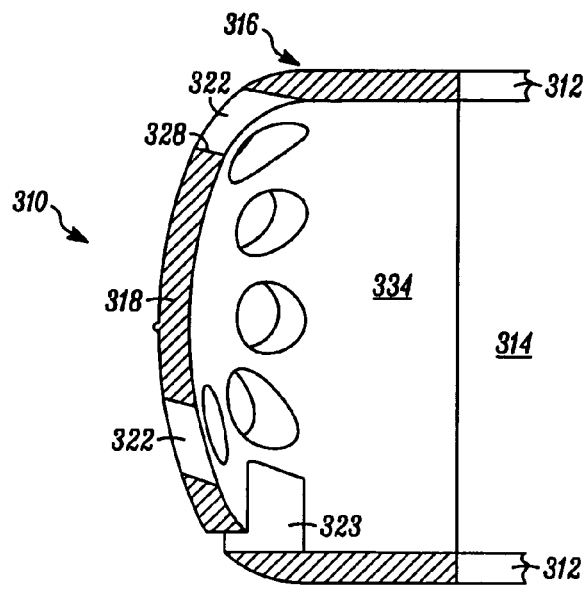
FIG. 16 is a somewhat schematic, cross-sectional view of the outlet portion of the nozzle of FIG. 15.
Figure 17A:
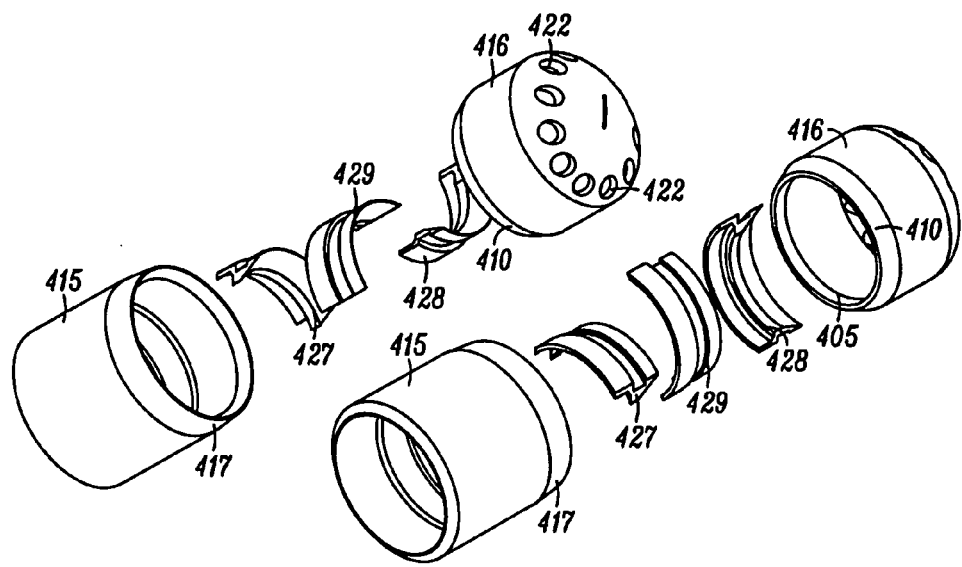
FIG. 17A is a exploded view of a fifth embodiment of a nozzle embodying the present invention and including a ceramic cover or outlet portion connected by a tri-ring socket portion to a metallic alloy inlet portion.
Figure 17B:
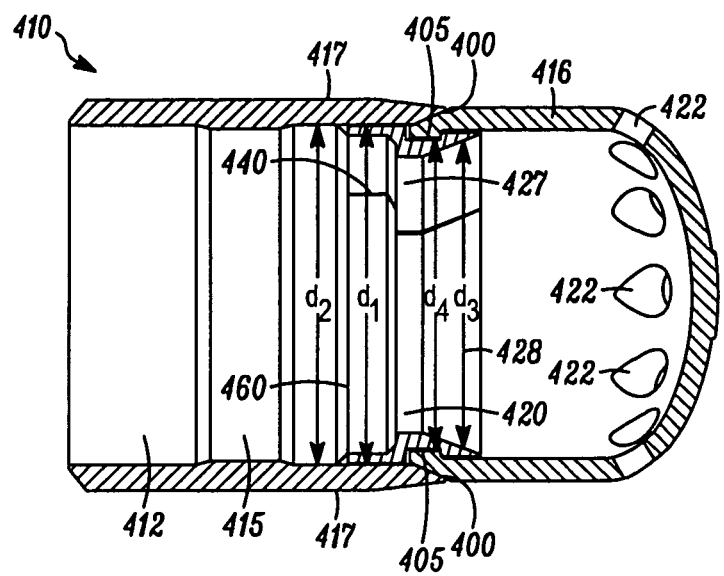
FIG. 17B is a side section view of the nozzle cover shown in FIG. 17A.
Figure 17C:
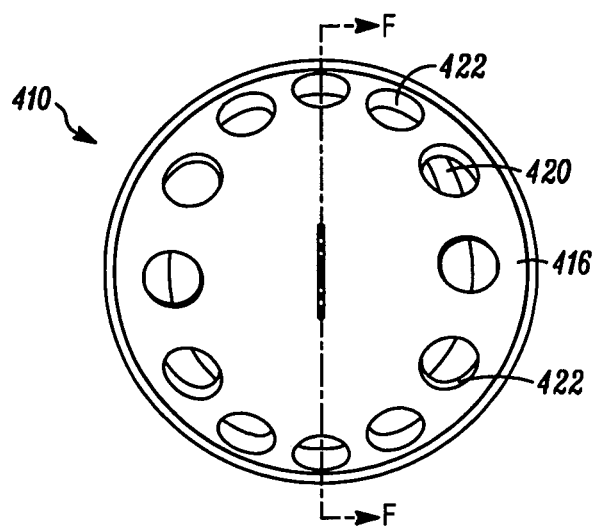
FIG. 17C is a top view taken along line F-F of FIG. 17B.
Figure 17D:
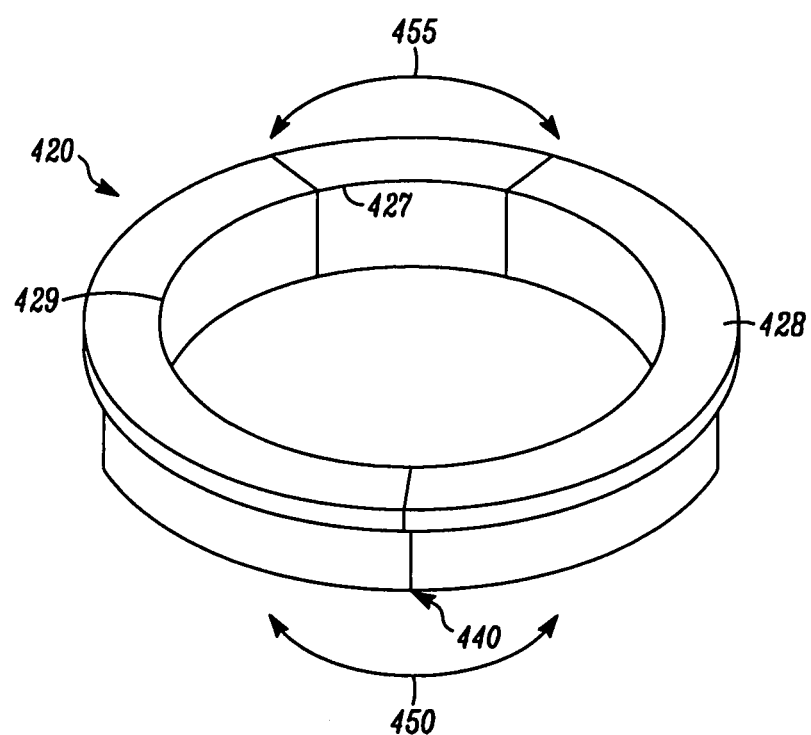
FIG. 17D is a top perspective view of the piece ring of the connector.

In FIGS. 15 and 16, another embodiment of a nozzle of the present invention is indicated generally by the reference number 310. The nozzle 310 is similar in certain respects to the nozzles 10, 110 and 210 described above with reference to FIGS. 1 through 14, and therefore like reference numerals are preceded by the numeral "3". The nozzle 310 is provided for discharging first and second fluids in an atomized spray into a vessel (not shown). The nozzle 310 comprises an inlet portion 312 defining at least one inlet conduit 314 for receiving first and second fluids. An outlet portion 316 is connected to the downstream end of the inlet portion 312. The outlet portion 316 defines an exterior surface 318 and a mixing chamber 334 for receiving the first and second fluids from the inlet portion. The outlet portion 316 further defines a plurality of first outlet apertures 322 extending through the exterior surface 318 in fluid communication with the mixing chamber 334, and angularly spaced relative to each other about a peripheral portion of the exterior surface for atomizing the first and second fluids in a spray pattern emanating therefrom. As with the nozzles 10 and 210 described above, the plurality of outlet apertures 322 are angularly spaced relative to each other about an axis of the outlet portion, and each outlet aperture defines a flow axis for directing a mixture of first and second fluids through the outlet aperture in the direction of the flow axis. Preferably, the plurality of flow axes cooperate to define a substantially flat fan spray pattern. The outlet portion 316 further defines at least one second outlet aperture 323 extending along an upstream side of the exterior surface 318 and in fluid communication with the mixing chamber 334 for directing a spray of the first and second fluids therefrom. At least some of the spray emitted from the second outlet aperture 323 is directed over the downstream portions of the exterior surface 318 to thereby prevent any catalyst, when used in FCCU applications, from collecting on the exterior surface and causing erosion of the surface. As can be seen, the second outlet aperture 323 extends substantially across the entire width of the upstream side of the exterior surface 318 of the outlet portion to ensure that the spray emitted therefrom substantially covers the downstream portions of the exterior surface 318 and thereby prevents erosion of such surface.

As may be recognized by those of ordinary skill in the pertinent art based on the teachings herein, the outlet portion 316 may define more than one second outlet aperture, and the one or more second outlet apertures may define any of numerous different shapes that are currently known, or that later become known for performing the function of the second outlet aperture(s). For example, the second outlet aperture may define a more uniform width throughout than shown, or may extend through a greater or lesser angular extent of the exterior surface than that shown. In addition, the first outlet apertures may take any of numerous different shapes, may be provided in any of numerous different patterns, and/or the outlet portion may include any desired number of such outlet apertures. Although the illustrated outlet portion 218 defines a substantially convex-shaped exterior surface, it may if desired define an exterior surface that substantially conforms to an internal contour of the vessel as described above or may define another shape.

One advantage of the nozzle 310 of the present invention is that the portion of the spray emitted from the second outlet aperture deflects catalyst away from the entire exterior surface of the outlet portion, thereby protecting the exterior surface from erosion that otherwise might be caused by any catalyst coming into contact therewith, or being deposited thereon. Yet another advantage of the nozzle 310 is that because the outlet portion is protected from the erosive effects of the catalyst, it can be manufactured from materials that are more resistant to thermal shock than are the materials currently used to manufacture such nozzles in FCCU applications. A still further advantage of the nozzle 310 is that the first outlet apertures can be arranged relative to each other to provide a virtual flat fan spray pattern that is particularly effective for FCCU applications.

Referring now to FIGS. 17A-D, another embodiment of a nozzle of the present invention is indicated generally by the reference numeral 410. The nozzle 410 is similar in certain respects to the nozzles 10, 110, 210 and 310 described above with reference to FIGS. 1 through 16, and therefore like reference numerals are preceded by the numeral "4", or preceded by the numeral "4" instead of the numerals "1", "2" or "3", are used to indicate like elements. The nozzle 410 is provided for discharging first and second fluids in an atomized spray into a vessel (not shown) and shares similar internal features and characteristic as the previously described nozzle embodiments. Additionally, the nozzle 410 includes outlet apertures 422. A primary difference is that in this nozzle embodiment, the ceramic outlet portion 416 and metallic inlet portion 412 are joined via the following construction. The ceramic outlet or cover 416 is configured in a substantially cylindrical fashion and defines a tapered section 400 on the outside wall and a reverse step or undercut 405 on the inside wall. The tapered section 400 engages a socket 415 having a similar taper 417 in a metal holder 425 which is welded to the metallic inlet portion 412 using a standard piping weld preparation. A ring 420 having two diameters fits inside both the cover 416 and the socket 415. At one end, the ring 420 has a diameter "d1" slightly smaller than the inside diameter of the socket "d2"; at the opposite end, the ring 420 has a diameter "d3" larger than the smallest inside diameter "d4" in the cover 416 so as to grip the reverse step 405. In order to permit installation of the ring, the ring 420 is split in at least two and, in one embodiment, at least three places, forming three ring pieces 427, 428 and 429. One of the splits 421 is along a radius extending from the axis of the part 410, and the other two splits 455 are along the chords 445. This permits installation of the two pieces 428, 429 which share the radial cut 440, followed by the installation of the final piece 427 with two chord cuts 455. If the final piece 427 was not cut along the chords it would not slide into position. Following assembly of the ring 420, the pieces 427, 428, 429 are welded in place to the socket 415. Shrinkage of the weld metal as it solidifies draws the cover 416 towards and into the socket 415, forming a joint 460 therebetween. This joining technique is applicable to any purpose of connecting similar shaped ceramic pieces to metal piping or tubing.

The purpose of the tapered socket portion 400 is to place the ceramic material in compression when the weld metal cools and shrinks. Expansion of the socket 415 in a radial direction and elongation of the ring pieces 427, 428 and 429 provides a compressive preload on the assembly. Sufficient preload is applied to prevent the relatively large amount of expansion of the metal that takes place at elevated temperatures from relaxing the connection and allowing the cover to become loose. As will be recognized by those of ordinary skill in the pertinent art based on the teachings herein, the specific dimensions can be adjusted to suit the needs of particular material combinations or operating conditions.

A problem with ordinary processing of ceramics is that geometrical features such as diameters are not perfect. Metal parts, on the other hand, tend to distort when machined and split. This lack of perfect geometry can lead to point contact between the mating parts which can lead to failure, especially of the ceramic, due to high stresses. While the elasticity of the metal provides protection because some deformation takes places as the parts are loaded, in one embodiment of the present invention a ceramic compound is applied between the mating parts and allowed to harden before final assembly. This provides both a liquid-tight seal and uniform contact between the parts.

In one embodiment of the invention, the end of the ring 420 is approximately flush with the end of the socket 415 in order that thermal expansion of the two is as equal as possible. Also, the ring may incorporate features that promote mixing as described in Bedaw et al. (U.S. Pat. No. 5,240,183) and Slavas et al. (U.S. Pat. No. 5,553,783), the contents of which are hereby incorporated by reference in their entirety as part of the present disclosure. Further, a preload may be applied to the ceramic outlet or cover 416 to prevent failure in tension, as described above.

As may be recognized by those of ordinary skill in the pertinent art based on the teachings herein, numerous changes and modifications may be made to the above-described and other embodiments of the nozzles of the present invention without departing from the scope of the invention as defined in the appended claims. For example, the ceramic outlet portion may be applied to any of the nozzles disclosed herein, or to any of numerous other types of nozzles. Similarly, the exterior surface of the outlet portion that substantially conforms to the interior contour of a vessel within which the nozzle is mounted may be applied to any of the nozzles disclosed herein, or to any of numerous other types of nozzles. Still further, any of numerous different materials, outlet aperture configurations, spray pattern configurations, mixing chambers, mixing structures and/or atomizers, that are currently known, or that later become known, may be employed in the various nozzles of the present invention. Accordingly, this detailed description of currently preferred embodiments is to be taken in an illustrative, as opposed to a limiting sense.

What is claimed is:

1. A spray nozzle for discharging at least one fluid in an atomized spray, comprising:
   a ceramic outlet defining at least one outlet aperture;
   a metallic inlet defining at least one inlet conduit for receiving the at least one fluid; and
   a metallic connector that connects the ceramic outlet to the metallic inlet and provides a compressive preload to the ceramic outlet to prevent looseness between the metallic inlet and the ceramic outlet following differential thermal expansion and contraction;
   wherein the metallic connector comprises a ring and a socket, the ring is sized to fit into the ceramic outlet and the socket, the ceramic outlet has a reverse step on an inside portion, the outlet engages the socket, and the ring has a first diameter at one end that is approximately equal to an inside diameter of the socket, and a second diameter at the opposite end that is larger than a smallest diameter of the outlet to engage the reverse step in the outlet.

2. A nozzle as defined in claim 1, wherein the metallic connector is configured to provide a compressive preload to the ceramic outlet in a radial direction with respect to an axis of the ceramic outlet.

3. A nozzle as defined in claim 1, wherein the inlet is configured to receive a first fluid and a second fluid, the outlet has an exterior surface, a plurality of outlet apertures extend through the exterior surface in fluid communication with the inlet and are angularly spaced relative to each other about an axis of the outlet, and each outlet aperture defines a flow axis for directing a mixture of first and second fluids through the outlet aperture in the direction of the respective flow axis.

4. A nozzle as defined in claim 3, wherein the outlet includes a plurality of outlet bosses, and each outlet boss defines a respective outlet aperture, a length (L), and a diameter (D), and L/D for each boss is at least about ½.

5. A nozzle as defined in claim 3 for use in a vessel having an internal surface contour, wherein the exterior surface substantially conforms to the internal surface contour of the vessel.

6. A nozzle as defined in claim 5, wherein at least a portion of the exterior surface has a radius that is substantially equal to a radius of the internal surface contour of the vessel.

7. A nozzle as defined in claim 5, wherein the vessel is one or more of a catalytic cracking and a reduced crude conversion vessel, the first fluid is a liquid, and the second fluid is a gas.

8. A nozzle as defined in claim 7, wherein the first fluid is oil and the second fluid is steam.

9. A nozzle as defined in claim 5, wherein approximately all of the flow axes of the outlet apertures are directed toward a target within the vessel for atomizing and directing a mixture of the first and second fluids in a spray pattern flowing in a direction across the target, and the target is substantially located within a plane extending in a flow direction of the spray pattern.

10. A nozzle as defined in claim 5, wherein the nozzle further comprises a mounting surface for mounting the outlet within an aperture in the vessel.

11. A nozzle as defined in claim 1, further comprising a mixing chamber in fluid communication between the inlet and the outlet for mixing first and second fluids therein.

12. A nozzle as defined in claim 11, further comprising at least one vane located between the mixing chamber and inlet, and extending transversely relative to an elongated axis of the inlet for receiving a portion of the first and second fluids and creating a swirling annular flow, and defining at least a portion of an aperture in an approximately central portion thereof for receiving a portion of the first and second fluids and creating a substantially axial flow.

13. A nozzle as defined in claim 1, wherein the ring is comprised of at least two pieces to facilitate installation of the ring into the outlet and socket.

14. A nozzle as defined in claim 1, wherein the outlet defines a plurality of substantially concentric outlet apertures radially spaced relative to each other and coupled in fluid communication with the inlet for directing the at least one fluid therethrough, and wherein the plurality of outlet apertures atomize the at least one fluid in a spray pattern emanating therefrom.

15. A nozzle as defined in claim 1 for use in a vessel, wherein
   the metallic inlet is configured to receive a first fluid and a second fluid; and
   the outlet includes an exterior surface, a plurality of first outlet apertures extending through the exterior surface in fluid communication with the inlet and angularly spaced relative to each other about an axis of the outlet, wherein each first outlet aperture defines a flow axis for directing a mixture of first and second fluids through the respective first outlet aperture in the direction of the respective flow axis, and at least one second outlet aperture located on an upstream side of the exterior surface for deflecting substance flowing in the vessel in an direction from an upstream toward a downstream direction thereof away from portions of the exterior surface located downstream of the second outlet aperture.

16. A nozzle as defined in claim 1, wherein the ceramic outlet has a tapered portion on an outside portion, the socket has a tapered portion, and the tapered portion of the outlet engages the tapered portion of the socket.

17. A nozzle as defined in claim 1, wherein the compressive preload includes a compressive preload in a radially inward direction toward an axis of the ceramic outlet.

18. A method as defined in claim 1, wherein the compressive preload includes a radially inward compressive preload.

19. A nozzle as defined in claim 1, wherein the metallic connector is separate from and attachable to the metallic inlet and the ceramic outlet to connect the ceramic outlet to the metallic inlet.

20. A method of spraying at least one fluid into one or more of a catalytic cracking or reduced crude conversion vessel, comprising the steps of:
providing a spray nozzle for discharging at least one fluid in an atomized spray into the vessel, wherein the spray nozzle comprises a ceramic outlet portion defining at least one outlet aperture, a metallic inlet portion defining at least one inlet conduit for receiving the at least one fluid, and a metallic connector that connects the ceramic outlet portion to the metallic inlet portion;
applying with the metallic connector a compressive preload to the ceramic outlet portion and, in turn, preventing looseness between the metallic inlet portion and the ceramic outlet portion during operating conditions of the nozzle following differential thermal expansion and contraction of the metallic inlet and the ceramic outlet during operation of the nozzle;
introducing a catalyst stream into the vessel; and
substantially preventing erosion of the nozzle by the catalyst stream by exposing only the ceramic outlet portion of the nozzle to the catalyst stream.

21. A method as defined in claim 20, further comprising forming an exterior surface of the outlet portion to substantially conform to an internal surface contour of the vessel to, in turn, minimize a profile of the outlet portion within the vessel and further substantially prevent erosion of the outlet portion by the catalyst stream.

22. A method as defined in claim 20, wherein the applying step includes welding the metallic connector to the metallic inlet portion and shrinkage of the weld metal as it cools applies the compressive preload.

23. A method as defined in claim 20, wherein the providing the metallic connector with a plurality of first threads and the metallic inlet portion with a plurality of second threads, and the applying step includes threading the metallic connector onto the metallic inlet portion to apply the compressive preload to the ceramic outlet portion.

24. A method as defined in claim 20, wherein the applying step includes welding the metallic connector to the metallic inlet portion and shrinkage of the weld metal as it cools applies the compressive preload.

25. A method as defined in claim 24, wherein the shrinkage of weld metal is selected to set a substantially predetermined compressive preload.

* * * * *